United States Patent [19]
Hodapp et al.

[11] Patent Number: 5,237,477
[45] Date of Patent: Aug. 17, 1993

[54] HEAD WIPER FOR BERNOULLI DISK DRIVE

[75] Inventors: Theodore Hodapp, Manti; James Wold, Sunset, both of Utah

[73] Assignee: Iomega Corporation, Roy, Utah

[21] Appl. No.: 757,126

[22] Filed: Sep. 10, 1991

[51] Int. Cl.⁵ ............................................. G11B 5/41
[52] U.S. Cl. .................................... 360/128; 360/137
[58] Field of Search ................................ 360/128, 137

[56] References Cited

U.S. PATENT DOCUMENTS

| | | | |
|---|---|---|---|
| 4,291,353 | 9/1981 | Fletcher et al. | 360/128 |
| 4,499,516 | 2/1985 | Purdy et al. | 360/128 |
| 4,516,176 | 5/1985 | Street | 360/128 |
| 4,556,890 | 12/1985 | Hermanson et al. | 346/74.4 |
| 4,558,386 | 12/1985 | Kara | 360/128 |
| 4,624,892 | 11/1986 | Ishizaki | 428/323 |

FOREIGN PATENT DOCUMENTS

| | | | |
|---|---|---|---|
| 58-147817 | 9/1983 | Japan | 360/128 |
| 62-88124 | 4/1987 | Japan | 360/128 |

*Primary Examiner*—Constantine Hannaher
*Attorney, Agent, or Firm*—Woodcock Washburn Kurtz Mackiewicz & Norris

[57] ABSTRACT

A disk drive has a head cleaner which cleans the heads each time the heads are moved from an operating position to a park position. The heads are slidably mounted to move into engagement with a disk when a cartridge containing the disk is inserted into the drive. When the heads are retracted to the park position, a wiper pad is inserted into the gap between the magnetic heads. This removes unwanted particulate matter from the heads.

7 Claims, 6 Drawing Sheets

HEAD WIPER FOR BERNOULLI DISK DRIVE

BACKGROUND OF THE INVENTION

This invention relates to magnetic disk drives, and more particularly, to a head cleaner for a disk drive used with a flexible magnetic disk contained in a rigid cartridge having a Bernoulli surface against which the disk is rotated.

"Flexible" or "floppy" disks are frequently used as a magnetic storage medium because of their portability and low cost. These disks are called "floppy" because they tend to sag away from their center when not otherwise supported. The space between a magnetic disk and the transducer is critical for proper non-contact data recording and pick-up. It has been common practice in the art to flatten and stabilize the floppy disk during the read/write operation by rotating the disk at high speeds in close juxtaposition to a flat plate sometimes called a Bernoulli plate. In this way, an air bearing is formed between the plate and disk such that the gap between the record surface and the plate is held constant.

U.S. Pat. Nos. 4,743,989—Bauck, et al; 4,794,480—Jones, et al; 4,740,851—Jones, et al; 4,855,849—Jones, et al; and 4,901,173—Jones, et al describe such disk drives.

In both rigid and floppy disk drives the cleaning of the magnetic heads is usually accomplished by using a cleaning medium which is rotated in the same manner that the normal data disk is rotated U.S. Pat. Nos. 4,663,686—Freeman, et al describes a head cleaning cartridge for Bernoulli type magnetic disk drives While such cartridges do effectively clean the heads, it is desirable to have a head cleaner in the drive itself so that cleaning will be accomplished routinely without the need for an operator to insert the head cleaning cartridge.

It is an object of the present invention to provide a cleaning device mounted in the drive and which can be used to clean the heads of a disk drive of the type shown in the aforementioned "Bernoulli plate" patents.

It is another object of the invention to remove the wiping requirement from the operator, who only rarely does the job and this causes drive failure.

SUMMARY OF THE INVENTION

In accordance with the present invention, a head cleaner is positioned in a path in which the magnetic read/write heads are slidable so that the head is cleaned when in contact with the cleaner.

In the Bernoulli drives previously described, the magnetic heads are juxtaposed on arms which are moved by an actuator in a plane parallel to the disks. When a cartridge containing disks is inserted into the drive, the heads slide from a "park" position to a position in which the heads engage the disks to read or write data from or to the disks In accordance with the invention, when the heads are moved back to the park position, the heads engage the fabric of a head cleaner. This removes unwanted particulate matter from the heads. A lubrication or head cleaning solution can be applied to the fabric to contribute to the cleaning process.

The foregoing and other objects, features and advantages of the present invention will be better understood from the following more detailed description and appended claims.

SHORT DESCRIPTION OF THE DRAWINGS

DESCRIPTION OF THE PREFERRED EMBODIMENT

Figure 1:
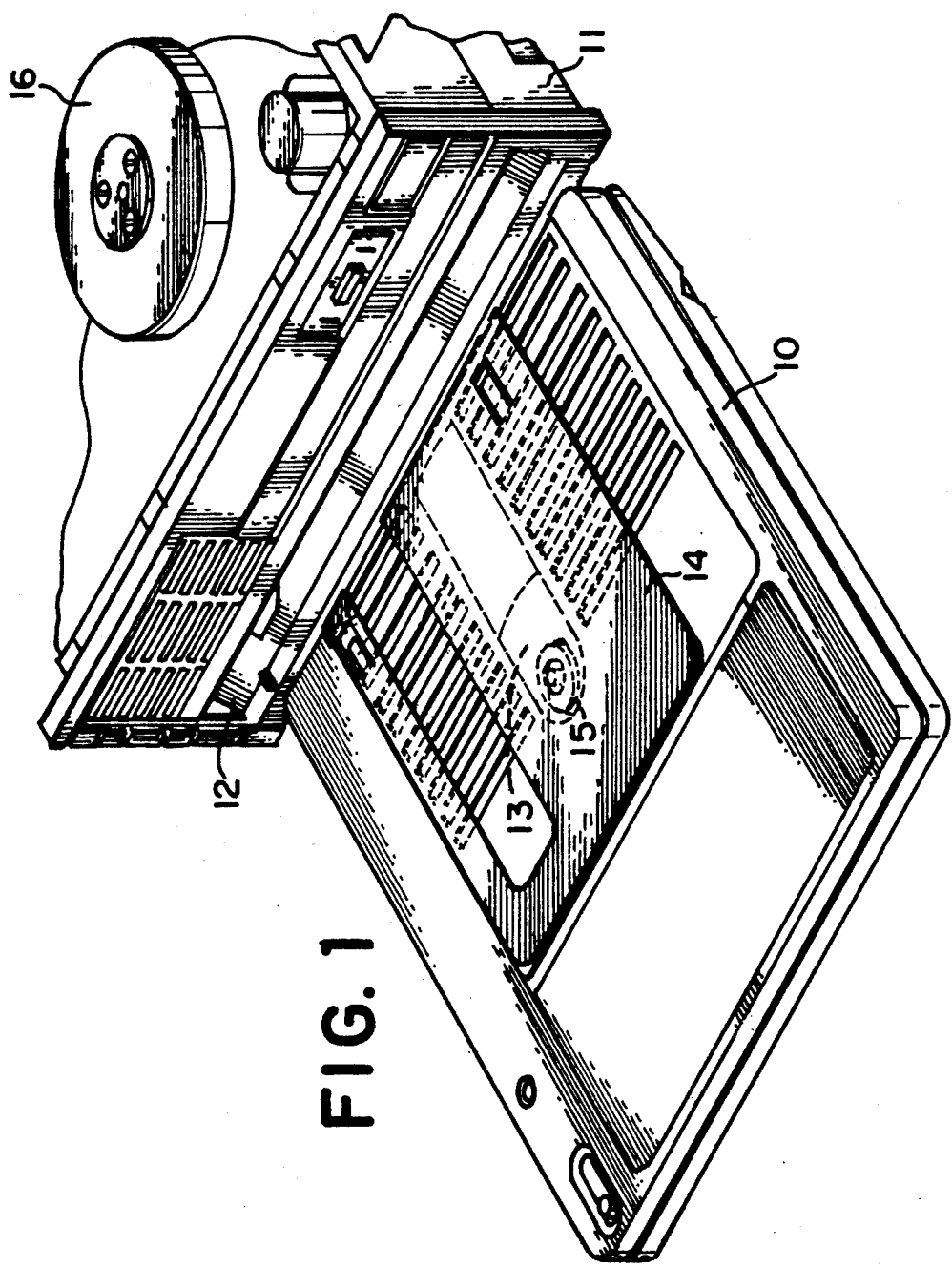
FIG. 1 is a cut-away perspective view of a disk drive on which this invention is an improvement.

FIGS. 1-4 show the disk drive on which the present invention is an improvement. Referring to FIG. 1, floppy disk cartridge 10 is shown in a top perspective view as it is about to enter disk drive chassis 11 through slot 12 in the front face of the disk drive chassis. Floppy disk 13 is enclosed by cartridge 10 and is revealed in phantom as indicated by the dashed lines. Cartridge cover 14 normally protects the floppy disk cartridge when not in use, but is displaced upon insertion of the cartridge into the disk drive whereupon floppy disk hub 15 rotatably engages the drive spindle. Rotor-bell 16 provides rotational inertia to the drive spindle.

Figure 2:
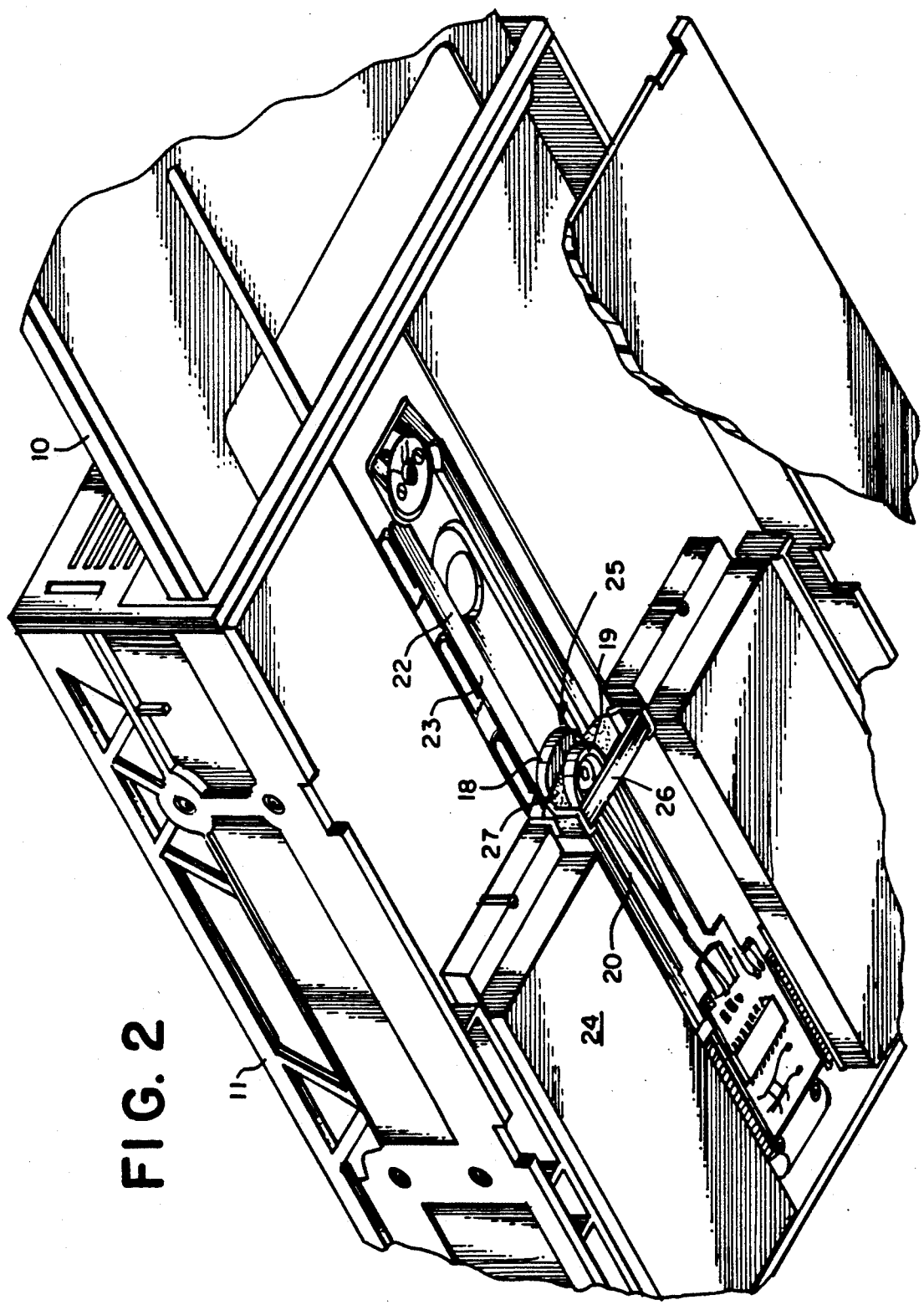
FIG. 2 is an exploded perspective view of the disk drive showing the spicule member and the heads in the park position where they engage the head cleaner.
Figure 3:
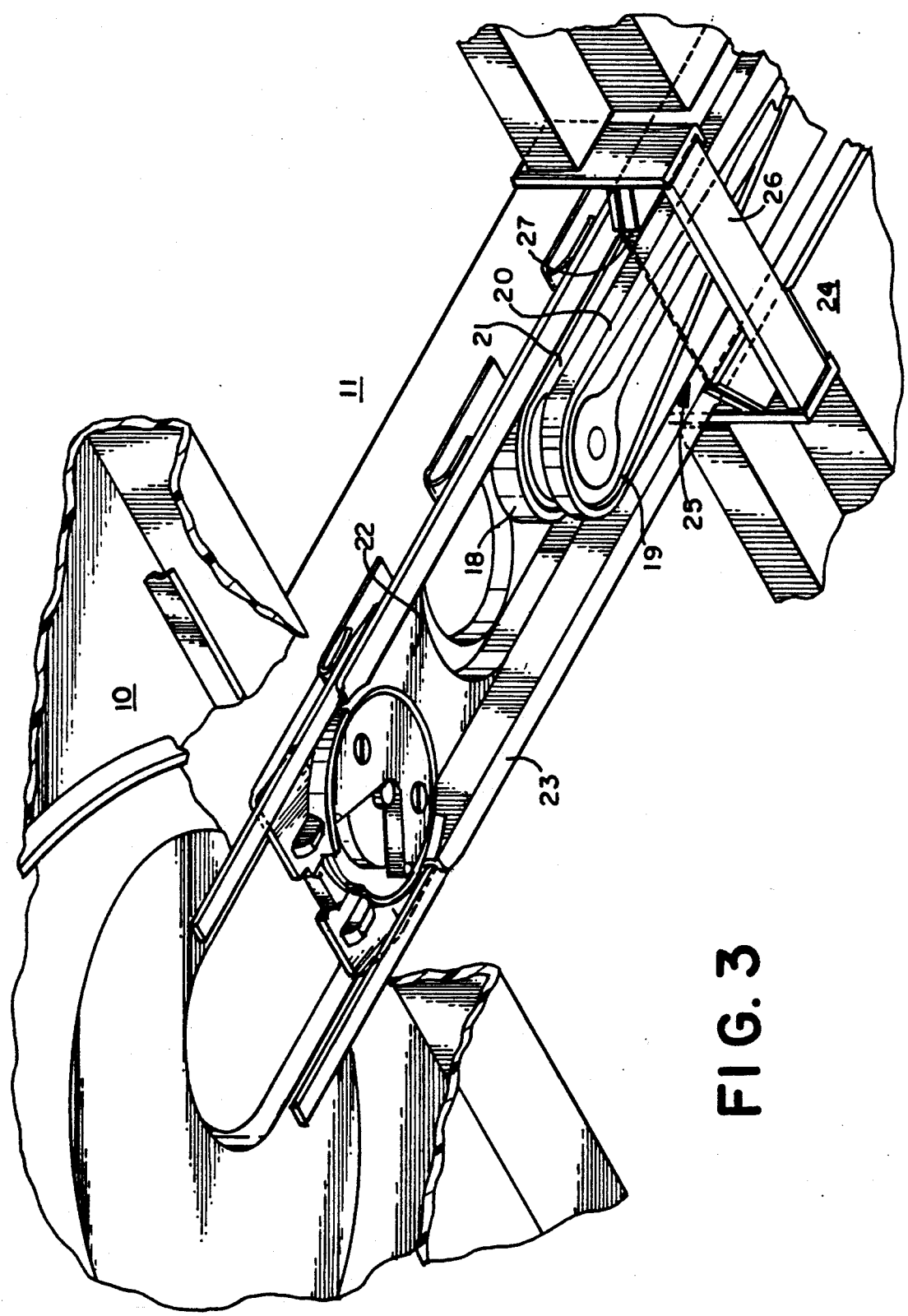
FIG. 3 is a partial broken-away view showing the spicule member entering the cartridge and showing the magnetic head assembly and head cleaner.

As shown in FIGS. 2 and 3, magnetic read/write heads 18 and 19 are mounted on arms 20 and 21 which are slidably mounted in a spicule assembly 22 which is fixed in the chassis. The arms 20 and 21 which carry the read/write heads 18 and 19 are slidable along rails in the channel 23.

Figure 4:
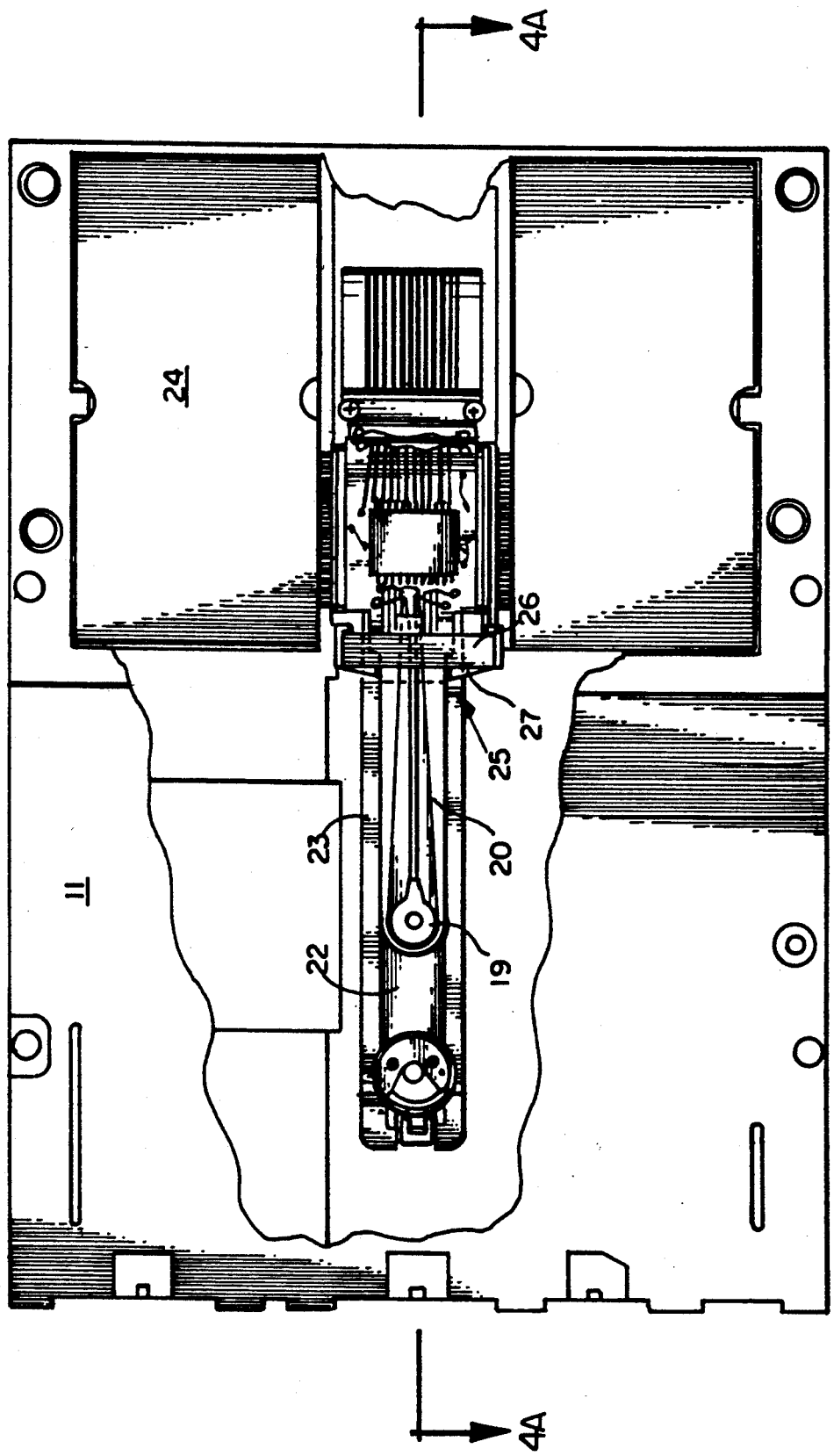
FIG. 4 is a top plan view partially cut away to show the spicule/head assembly and the head cleaner of the present invention.
Figure 4A:
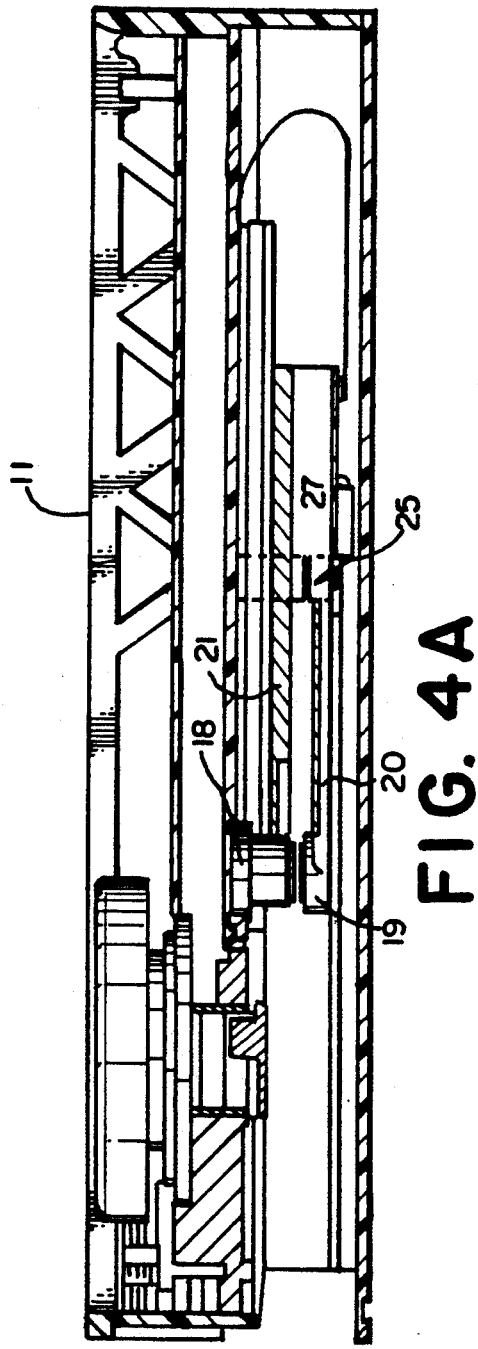
FIG. 4A is a section on the line 4—4 of FIG. 4.
Figure 6:
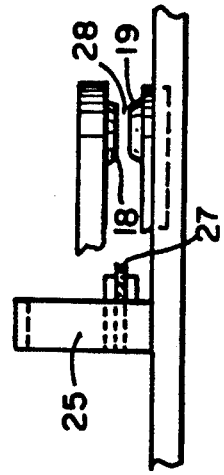
FIG. 6 is a schematic representation of the head cleaner and heads.
Figure 5:
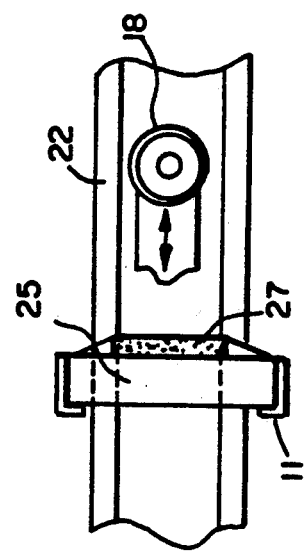
FIG. 5 is a schematic representation of the spicule and head cleaner.

The heads 18 and 19 are moved by an actuator 24 which is shown in FIG. 4. The heads move between a park position, and an operating position in which the heads 18 and 19 engage magnetic disks 13 which are in the cartridge 10. The magnetic heads 18 and 19 are juxtaposed to read the surfaces of two magnetic disks.

The magnetic head cleaner 25 of the present invention is positioned in the path in which the read/write heads 18 and 19 are slidable so that the heads are cleaned when in contact with the cleaner The head cleaner 25 has a U-shaped wiper mount block 26 with a wiper pad 27 suspended between two legs of the block. When the magnetic head assembly moves from the operating position into the park position, the wiper pad 27 of head cleaner 24 wipes particles of dirt off of the head faces. The wiper pad 27 enters the gap 28 between the heads 18 and 19 as the heads return to the park position. Cleaning also occurs as the heads move out of the park position.

Figure 7:
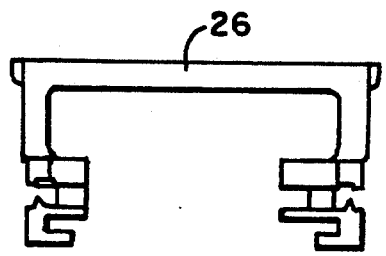
FIG. 7 is a side view of the frame of the head cleaner.
Figure 8:
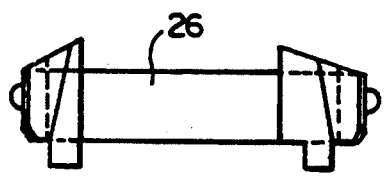
FIG. 8 is a bottom view of the frame of the head cleaner.

As shown in FIGS. 7 and 8 the wiper mount block 26 has slots 29 and 30 in each leg. The wiper pad 27 is inserted into these slots. Then, the slot is closed by ultrasonic welding of the plastic legs to secure the pad 27 in the legs of block 26.

Figure 9:
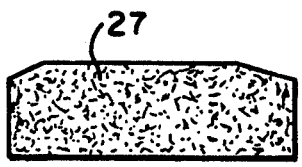
FIG. 9 shows the fabric in the head cleaner.

The wiper pad 27 is shown in FIG. 9. It is a random structure fabric material For example, Freudenberg ID-177 available from Freudenberg Corp. located in Chelmsford, MA, is suitable for use.

The wiper pad must be cut parallel to the running edge of the roll of fabric with no wrinkles in the fabric. During assembly, the fabric in the pad between the supporting arms must not be touched with fingers and must be kept free from any contamination. Lubricant or head cleaning fluid may be added to the fabric of wiper pad 27 if desired. For example, the fabric may be impregnated with mineral oil.

While a particular embodiment has been shown and described, various modifications are within the true spirit and scope of the invention. The appended claims are, therefore, intended to cover all such modifications.

What is claimed is:

1. A disk drive for writing and reading data to and from a disk comprising:
    a chassis;
    a magnetic read/write head slidably mounted with respect to said chassis in a plane parallel to said disk, said read/write head being movable between a park position and a read/write position in which said head interacts with said disk, said read/write head including two magnetic heads juxtaposed to read from or write to the magnetic disk surfaces; and
    a head cleaner positioned in the path in which said read/write head is slidable so that said magnetic heads are cleaned when in contact with said cleaner, said head cleaner being mounted at said park position so that said head cleaner engages said read/write head when said head is in said park position, said head cleaner having a U-shaped wiper mount block with a wiper pad suspended between two legs of said block such that opposing surfaces of said magnetic head contact opposite sides of said wiper pad.

2. The disk drive recited in claim 1 further comprising:
    arms for mounting said magnetic heads; and an actuator for moving said arms so that said heads are moved between a park position and a read/write relationship with said disk.

3. The disk drive recited in claim 1 wherein said U-shaped wiper mount block has slots in each leg thereof, said wiper pad being secured in said slots.

4. The disk drive recited in claim 3 wherein said wiper pad is a random structured fabric.

5. The disk drive recited in claim 4 further including a head lubricating fluid on said fabric.

6. The disk drive recited in claim 1 wherein said disk is contained in a cartridge and wherein said head slides in a plane parallel to said disk when said cartridge is inserted in said drive.

7. The disk drive recited in claim 6 wherein said disk is a floppy disk stabilized by a Bernoulli surface.

* * * * *